Patented Dec. 5, 1939

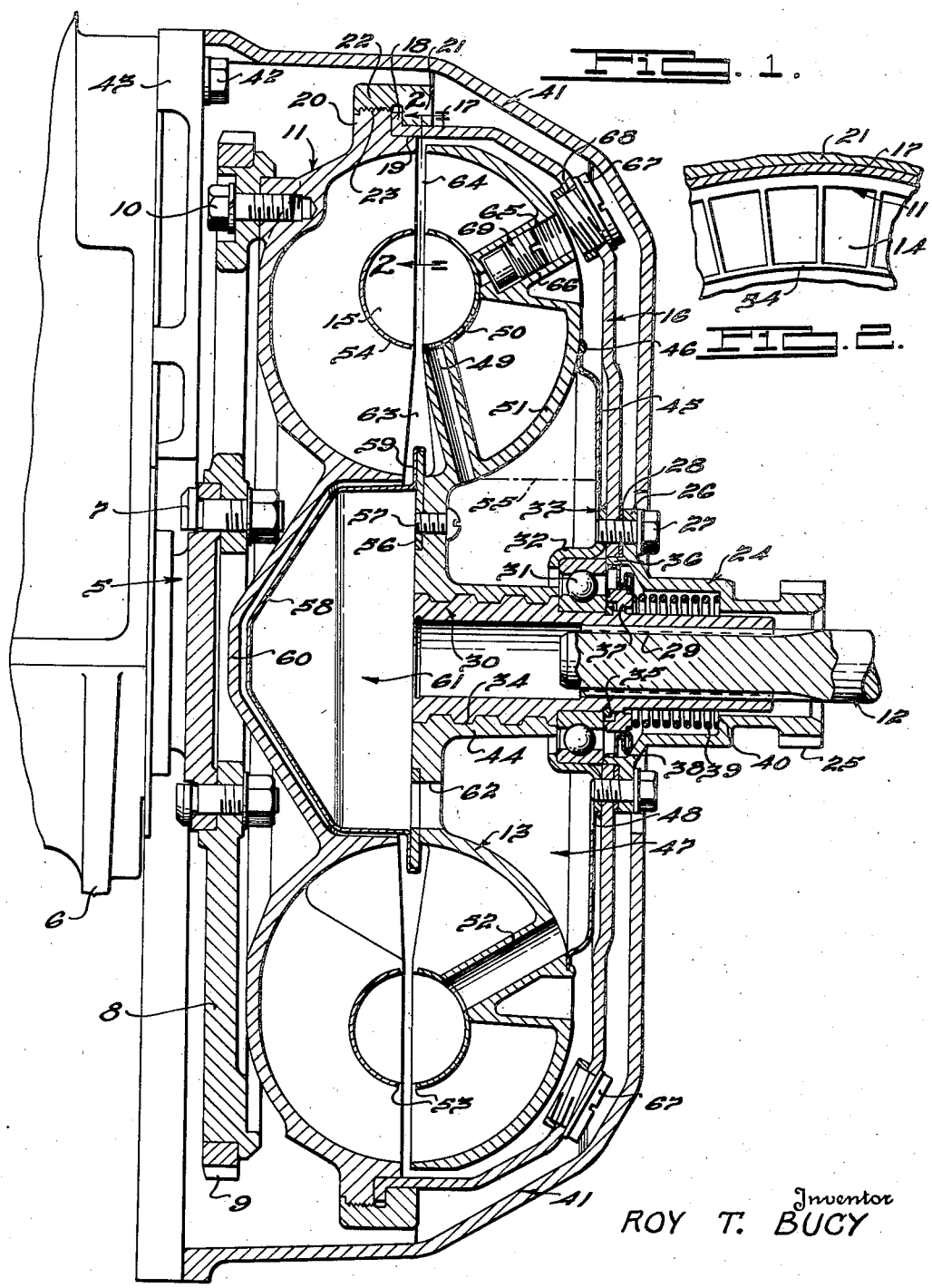

2,182,394

UNITED STATES PATENT OFFICE 2,182,394

FLUID COUPLING

Roy T. Bucy, Detroit, Mich., assignor to Chrysler Corporation, Highland Park, Mich., a corporation of Delaware Application April 19, 1937, Serial No. 137,701

6 Claims. (Cl. 60—54)

This invention relates to fluid couplings and drives employing fluid couplings for propelling motor vehicles or for other power transmission.

Heretofore in motor vehicles power transmission systems employing fluid couplings, difficulty has been experienced by reason of a tendency of the vehicle to creep or drive slowly when the engine is idling and the transmission is in gear. In other words, it has been found necessary in bringing the vehicle to rest, to manipulate the transmission into neutral or apply the usual brakes to oppose the drive or drag transmitted through the fluid coupling at engine idling speed.

One object of my invention is to materially reduce the aforesaid difficulties by the provision of a comparatively large capacity expansion chamber included within the fluid coupling as a unitary part thereof.

Another object of my invention is to provide an improved fluid coupling having a fluid expansion chamber of relatively great capacity carried by the coupling runner, or driven member, and which is so constructed and arranged as to preserve the compactness of the coupling assembly and maintain a comparatively small over-all length thereof.

By so providing a fluid coupling having its fluid expansion chamber fixed to the coupling runner, or fixed to the coupling impeller if desired, and constituting a permanent part of the fluid coupling, balancing operations on the coupling are facilitated, inasmuch as the rotative part of the coupling can be satisfactorily balanced as a "unit" and the coupling then installed in a motor vehicle or other power transmitting mechanism without further balancing even though the coupling be subsequently removed from said vehicle for any reason.

A still further object of my invention resides in a novel and inexpensive means for satisfactorily balancing a fluid coupling, preferably after the fluid has been added, and permanently maintaining the coupling in balance indefinitely, without disassembling any fixed part of the fluid coupling to make this adjustment.

Further objects and advantages of my invention will be apparent from the following detailed description of one embodiment thereof, reference being had to the accompanying drawing, in which:

Fig. 1 is a central, vertical, sectional view of a fluid coupling embodying the invention.

Fig. 2 is a fragmentary detail, sectional view taken approximately as indicated by the line 2—2 of Fig. 1.

Referring to the drawing, reference character 5 represents the power driving shaft, such as an engine crankshaft, housed within the motor block 6 and suitably fixed at 7 to a flywheel 8 having starter teeth 9 adapted for engagement with the usual engine starting device (not illustrated herein) but of well-known construction. The flywheel 8 has suitably fixed thereto as by bolts 10, the impeller or driving member 11 of the fluid coupling.

The driven shaft 12 of the coupling corresponds to the driving shaft which ordinarily connects the clutch of a vehicle to the transmission mechanism thereof. A runner or driven member 13 is non-rotatably mounted on the shaft 12.

In the impeller 11 and runner 13 are companion vane-forming chambers 14 around the annular vortex chamber or space 15 so that as the impeller rotates, the fluid will be thrown outwardly and toward the chambers 14 of the runner 13, inducing rotation of the latter as is generally well-known in the art.

Any suitable means may be used to connect the outer cover plate 16 with the impeller member 11, but I prefer to illustrate my invention with the threaded fastener of Fig. 1. The outer cover plate 16 is provided with a forwardly extending annular flange 17 bent outwardly at 18 into contact with the rear peripheral face of an L-shaped groove 19 formed by a flange 20 of the impeller member 11. Fitting in the angular pocket provided by the flange 18 and the forwardly extending portion 17 is a flange 21 of a threaded collar 22. In assembling the outer cover plate 16 to the impeller 11 either the collar 22 or impeller 11 is rotated to place the collar's threaded portion in leak-proof engagement with external threads 23 formed on flange 20, the outwardly extending portion 18 being tightly locked between the L-shaped groove 19 and flange 21.

A rearwardly extending hollow sleeve 24, if desired, may surround the driven shaft 12 for rotation independently thereof. The rearward portion of sleeve 24 carries an external gear 25 whereby a suitable pressure pump (not shown) may be driven at the speed of the driving shaft 5 by reason of an outwardly extending flange 26 of sleeve 24 being drivingly connected by bolts 27 to the cover plate 16, a washer 28 preferably being interposed between the plate 16 and the flange 26.

The driven shaft 12 is drivingly connected through splines 29 with a driven hollow sleeve 30, this sleeve suitably rotatably journalling, as by a ball bearing 31, the closely fitting flange 32 of an extension support member 33 fixed to plate 16 by the bolts 27. A suitable external thread 34, preferably of a coarse thread, formed on the forward portion of the driven sleeve 30 provides a forward stop for bearing 31 while a lock-ring 35 carried by sleeve 30 affords a rearward stop therefor. Fore and aft movement of the sleeve 30 and bearing 31 are respectively prevented by the closely fitting flange 32 and a forward projection 36 of flange 26.

It is desirable to prevent fluid leakage along sleeve 30, as will hereinafter be more apparent, and to this end I desire to illustrate in connection with my invention a fluid sealing face member 37 closely surrounding sleeve 30 just rearwardly of bearing 31. A resilient skirt member 38 is interposed between the face member 37 and projection 36 to maintain a leakproof condition therein for preventing the rearward passage of fluid. A yielding means, such as a coil-spring 39, surrounds the sleeve 30 and bears between a shoulder 40 on the sleeve 24 and the sealing member 37 for yieldingly urging the sealing members 37 and 38 against the bearing 31. A suitable fluid coupling casing 41 houses the coupling members and is preferably connected by bolts 42 to a backing member 43 and motor block 6.

An internally threaded extension 44 of the runner 13 is adapted to be drivingly connected with the external thread 34 of the sleeve 30 to transmit the drive from the runner to the driven shaft 12.

An annular dished plate 45 is suitably supported by a peened-over circumferentially extending projection 46 of runner 13 and forms the rear wall of a fluid expansion chamber 47, an annular opening 48 of plate 45 providing communication with the chamber 47 and the exterior of runner 13.

In order to provide adequate communication between chamber 47 and vortex chamber 15, I prefer to include a plurality of fluid-transmitting passages 49 circumferentially arranged and positioned between the innermost portion of the inner vortex member 50 and the innermost portion of the outer vortex member 51 of runner 13 for purposes as will presently be apparent.

To assist in providing additional communication between chambers 15 and 47 I prefer to use fluid transmitting passages 52 of greater capacity than passages 49, the passages 52 being circumferentially arranged in the runner 13 and having one end adjacent the edge of the dished plate 45. It is obviously evident that when fluid is in the expansion chamber 47 and the driving shaft 5 rotates with sufficient speed, the oil is thrown outwardly by centrifugal force through passages 49 and 52 to chamber 15 where it passes through a spaced clearance 53 between the adjacent faces of the inner vortex members 50 and 54 of the runner and impeller respectively to join the fluid flow in the vane forming chambers 14. When the amount of fluid in expansion chamber 47 is sufficient upon rotational movement of the driving shaft 5 to be thrown outwardly to form a fluid level above that indicated at 55, the fluid will be quickly transferred through passages 49 and 52 to chamber 15. However when the amount of fluid in expansion chamber 47 is only sufficient to form a level below the level 55, the fluid transfer is effected entirely through passages 49.

I prefer to illustrate a baffle plate in my fluid coupling, and to this end I have provided an annular plate 56 suitably fixed to the runner 13 as by screws 57. The baffle plate 56 is thus adapted to project into the innermost portion of the vane forming chambers 14 and to break up or disturb the flow or eddies of the fluid in chambers 14 to effect free slippage of the coupling during low speed operation of the driving shaft 5.

The fluid capacity of the expansion chamber 47 of my novel fluid coupling may be increased materially, if desired, by a dished forward plate 58 having a flange 59 flush with baffle plate 56 and with its edge turned over the periphery of the plate 56. A forwardly extending portion 60 of impeller 11 provides a space for accommodating the auxiliary expansion chamber 61 within the coupling. Communication between chambers 47 and 61 is provided by a series of circumferentially arranged ports 62 formed in the central web portion of the runner 13, the ports preferably being positioned adjacent the periphery of plate 58 so that during rotation thereof any fluid in auxiliary chamber 61 will be transferred to chamber 47.

Normally it is desirable to fill my fluid coupling with fluid to about three-fourths of its capacity, the fluid medium being oil, water, or other suitable fluid. When driving shaft 5 is stationary, the chambers 47 and 61, as well as a portion of passages 49 and 52, are filled with fluid. As the driving shaft is rotated with increasing speed the centrifugal force on the fluid becomes greater and greater and thus forces the fluid outwardly in its well-known travel in the vane forming chambers 14, the chambers 47 and 61 quickly being unloaded through passages 49 and 52 as described.

In other words, the impeller 11 will rotate with the driving flywheel 8 to cause the fluid to circulate under the action of centrifugal force from space 63 outwardly through the impeller vane passages for discharge at the space 64 where the fluid enters the runner vane passages for discharge at the space 63. The runner is thus driven from the impeller and the slip between the parts rapidly diminishes as the speed of the impeller increases. Any of the fluid leaking to the outside of the runner 13 tends to return to chamber 47 through opening 48 of plate 45.

Thus it will be evident that when the driving shaft 5 is being driven at engine idling speed, a great volume of the fluid in the coupling will remain in the expansion chambers 47 and 61 due to insufficient centrifugal force. It is obvious that a reduced volume of fluid flowing within the impeller vane passages will lower the energy transmitted thereby to the runner, and consequently effect greater slippage between the impeller and the runner. This action, assisted by the function of the baffle plate 56, makes it unnecessary to manipulate a transmission into neutral, or to apply the brakes of a motor vehicle in order to hold the latter at rest.

It is readily apparent that my improved fluid coupling utilizes in a novel and inexpensive manner, all available space within the coupling as an adequate expansion chamber and yet a very compact coupling assembly is obtained having a comparatively small over-all length. The provision of an expansion chamber of large capacity in a coupling permits heated air and fluid to circulate and guards against bursting of the coupling when operating under severe driving conditions.

Referring now to my novel and inexpensive means for balancing the fluid coupling, a plurality of circumferentially arranged threaded holes 65 are provided in rib-like members 66 of runner 51. These holes open outside of runner 51 and are movable by rotation of the runner 51, into registration with fluid filler plugs 67 threaded in fluid filler holes 68 extending through the cover plate 16. Weights comprising threaded plugs 69 are adapted to be adjustably positioned within the threaded holes 65.

The assembled fluid coupling may be filled with fluid to the desired level through the filler holes 68, and then balanced by adjusting the plugs 69 individually from outside the cover plate 16 through the filler holes 68. When the coupling is satisfactorily balanced, the threads of holes 65 may be peened over, if desired, to maintain the coupling in balance indefinitely by locking the plugs 69 in their proper positions.

Hence, it is evident that my fluid coupling, with its self-contained adequate expansion chamber therein and its means for easily balancing and maintaining the balance, can be manufactured as a unit and then balanced but once for the life of the coupling. The balanced coupling can then be installed conveniently in a motor vehicle or other power transmitting system without further balancing even though the coupling be subsequently removed from said vehicle for any reason.

Various minor modifications and changes may be effected in the above application without departing from the spirit of this invention or from the scope of the appended claims.

I claim:

1. A fluid coupling including driving and driven members, a runner rotor structure secured to said driven member, an impeller rotor structure secured to said driving member having a housing portion substantially enveloping said runner rotor structure, and provided with a fluid medium filling opening, a closure for said opening, and an adjustable member carried by said runner rotor structure and accessible through said opening from the exterior of said housing portion for balancing said runner rotor structure.

2. A fluid coupling including driving and driven members, a runner rotor structure secured to said driven member, an impeller rotor structure secured to said driving member having a housing portion substantially enveloping said runner rotor structure, and provided with a fluid medium filling opening, a closure for said opening, and a plurality of adjustable members circumferentially spaced about said runner rotor structure each registerable with and accessible through said opening for balancing said runner rotor structure.

3. A fluid coupling including driving and driven members, a runner rotor structure secured to said driven member having circumferentially spaced threaded openings therein, an impeller rotor structure secured to said driving member having a housing portion substantially enveloping said runner rotor structure and provided with a fluid filling opening with which said threaded openings are registerable, and a balancing member threaded in each threaded opening and accessible through said fluid filling opening for balancing said runner rotor structure.

4. In a fluid coupling including a rotatable impeller element and a rotatable runner element, said elements cooperating to form a fluid circuit working chamber, means including a baffle member carried by one of said elements and extending into said chamber for interrupting the fluid circuit therein, and a fluid expansion chamber forming member supported from said baffle member, said chambers being in fluid communication.

5. A fluid coupling including a rotatable driving and a rotatable driven member, said members having walls cooperating to form a fluid operating circuit, a core ring in said circuit providing an annular fluid chamber, a fluid reservoir rotatably connected to one of said members, and a plurality of fluid passageways carried by said last named member and communicating with said core ring and said reservoir, each of said passages being adapted to accommodate the flow of fluid operating medium to and from the chamber and core ring respectively, said last named member having openings in the wall thereof for accommodating the flow of fluid between a respective passageway and said reservoir, at least one of said openings communicating with said reservoir radially outwardly beyond the communication of another of said openings with said reservoir.

6. In a fluid coupling, runner and impeller structures each including a wall bounding a fluid working chamber, means carried by one of said structures for providing a fluid expansion chamber, said last mentioned structure having means including openings in the wall thereof for accommodating the flow of the fluid operating medium between said chambers, one of said openings being located a greater radial distance from the axis of said coupling than the other of said openings.

ROY T. BUCY.